United States Patent
Wu et al.

(10) Patent No.: US 8,556,163 B2
(45) Date of Patent: Oct. 15, 2013

(54) METHOD AND DEVICE FOR RECOGNIZING OPTICAL SPLITTER AND OPTICAL SPLITTER PORTS

(75) Inventors: Shiquan Wu, Shenzhen (CN); Bo Wang, Wuhan (CN); Xiaolei Shan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/455,311

(22) Filed: Apr. 25, 2012

(65) Prior Publication Data

US 2012/0205446 A1    Aug. 16, 2012

Related U.S. Application Data

(63) Continuation of application No. PCT/CN2010/078053, filed on Oct. 25, 2010.

(30) Foreign Application Priority Data

Oct. 26, 2009    (CN) .......................... 2009 1 0110378

(51) Int. Cl.
    *G06F 19/00*    (2011.01)
(52) U.S. Cl.
    USPC ............ 235/375; 235/454; 235/487; 235/492
(58) Field of Classification Search
    USPC ................... 235/375, 454, 487, 492
    See application file for complete search history.

(56) References Cited

U.S. PATENT DOCUMENTS

| 6,968,994 B1 | 11/2005 | Ashwood Smith |
| 7,027,704 B2 | 4/2006 | Frohlich et al. |
| 7,468,669 B1 | 12/2008 | Beck et al. |
| 2010/0178058 A1* | 7/2010 | Kozischek et al. ........... 398/115 |

FOREIGN PATENT DOCUMENTS

| CN | 1095484 | 11/1994 |
| CN | 101142826 | 3/2008 |
| CN | 101247532 | 8/2008 |
| RU | 2272308 | 2/2005 |
| WO | 2006/063023 | 6/2006 |
| WO | 2008/076235 | 6/2008 |

OTHER PUBLICATIONS

International Search Report for PCT/CN2010/078053 mailed Feb. 10, 2011.

International Search Report dated Feb. 10, 2011 issued in corresponding International Patent Application No. PCT/CN2010/078053.

(Continued)

*Primary Examiner* — Allyson Trail
(74) *Attorney, Agent, or Firm* — Staas & Halsey LLP

(57) ABSTRACT

An optical splitter is provided according to the embodiments of the present invention, which includes an optical splitter module and an outlet port connected to the optical splitter module, the outlet port includes a port connector and an electronic label set on the port connector, identification information is set in the electronic label, and the identification information includes identity information of the optical splitter and the outlet port of the optical splitter. A method and a device for recognizing an optical splitter and optical splitter ports are also provided according to the embodiments of the present invention. In this way, the optical splitter and the optical splitter ports are rapidly determined and distinguished, thereby improving the efficiency of recognizing the optical splitter and the optical splitter ports.

11 Claims, 2 Drawing Sheets

(56) References Cited

OTHER PUBLICATIONS

Written Opinion of the International Searching Authority dated Feb. 10, 2011 issued in corresponding International Patent Application No. PCT/CN2010/078053.
Extended European Search Report mailed Apr. 16, 2013 for corresponding European Application No. 10826067.0. (6 pages).
First Chinese Office Action mailed Mar. 14, 2013 for corresponding Chinese Application No. 200910110378.6. (Translation 4 pages).
Russian Office Action mailed May 6, 2013 in corresponding Russian Patent Application No. 2012121714 (4 pages) (3 pages English Translation).
New Zealand Office Action mailed Jul. 5, 2013 in corresponding New Zealand Application No. 5996712 (2 pages).
Mexican Office Action mailed Jun. 10, 2013 in corresponding Mexican Patent Application No. MX/a/2012/004866 (3 pages) (1 page English Translation).
Australian Office Action mailed Jun. 25, 2013 in corresponding Australian Patent Application No. 2010312072 (3 pages).

* cited by examiner

METHOD AND DEVICE FOR RECOGNIZING OPTICAL SPLITTER AND OPTICAL SPLITTER PORTS

CROSS-REFERENCE TO RELATED APPLICATIONS

This application is a continuation of International Application No. PCT/CN2010/078053, filed on Oct. 25, 2010, which claims priority to Chinese Patent Application No. 200910110378.6, filed on Oct. 26, 2009, both of which are hereby incorporated by reference in their entireties.

FIELD OF THE INVENTION

The present invention relates to the field of communications technologies, and in particular, to a method and a device for recognizing an optical splitter and optical splitter ports.

BACKGROUND OF THE INVENTION

Like a coaxial cable transmission system, an optical network system also needs to couple, divide and distribute optical signals, which are implemented by an optical splitter (Optical splitter). An optical splitter is also called a splitter, which is one of the most important passive components in an optical fiber link, and is an optical fiber tandem component with multiple input ports and output ports, where M×N generally indicates a splitter with M input ports and N output ports.

The optical splitter is formed by input ports, output ports and an optical splitter module, where the optical splitter module mainly includes a Splitter chip. The optical splitter provides a light splitting function in optical network links, that is, a light is input from an input port, divided into N parts through the optical splitter module, and output from output ports, thereby implementing bandwidth allocation. The optical splitter provides an optical fiber to connect to a jumper through an adapter, and is ultimately connected to a user side, thereby implementing light splitting on a PON (Passive Optical Network, passive optical network).

With increasing demands of people for various services and continuous emergence of new services, bandwidth provided by the existing copper access cannot meet the requirements of people, and optical fiber access is a necessity. As the first scheme of the existing fiber access, the PON fulfils the requirements of people on large bandwidth. As the core component of a PON access technology, the optical splitter plays a critical part.

However, in the existing PON access networks, density of optical fiber jumpers in equipment rooms of operators is increasing, and optical splitters are mixed with orderless fiber cabling in the equipment rooms; therefore, it is hard to distinguish different optical splitters and corresponding optical splitter ports.

In the prior art, silkscreen identifiers or paper labels are attached on optical splitter ports to determine the optical splitter ports. During construction, each optical splitter port is determined according to the silkscreen identifiers or paper labels; besides, identification paper may be attached on an optical splitter to record users corresponding to each optical splitter port.

In the implementation of the present invention, the inventors find that the prior art at least has the following problems.

For sites having an optical distribution frame (Optical Distribution Frame, ODF) with hundreds of cores, it is hard to rapidly determine and distinguish different optical splitters and each optical splitter port by using the mechanical identification method (through silkscreen identifiers or paper labels), and the mechanical identification method for recognizing an optical splitter and optical splitter ports is inefficient.

SUMMARY OF THE INVENTION

Embodiments of the present invention provide a method and a device for recognizing an optical splitter and optical splitter ports, so as to rapidly determine and distinguish the optical splitter and the optical splitter ports, thereby improving the efficiency of recognizing the optical splitter and the optical splitter ports.

An embodiment of the present invention provides an optical splitter, which includes an optical splitter module and an outlet port connected to the optical splitter module, the outlet port includes a port connector and an electronic label set on the port connector, identification information is set in the electronic label, and the identification information includes identity information of the optical splitter and the outlet port of the optical splitter.

An embodiment of the present invention provides a method for recognizing optical splitter ports, which includes:

obtaining identification information set in an electronic label on an outlet port of an optical splitter, where the identification information includes identity information of the optical splitter and the outlet port of the optical splitter;

parsing the obtained identification information to acquire the identity information of the optical splitter and the outlet port of the optical splitter; and displaying the identity information of the optical splitter and the outlet port of the optical splitter.

An embodiment of the present invention provides a device for recognizing optical splitter ports, which includes:

an obtaining unit, configured to obtain identification information set in an electronic label on an outlet port of an optical splitter, where the identification information includes identity information of the optical splitter and the outlet port of the optical splitter;

a parsing unit, configured to parse the obtained identification information to acquire the identity information of the optical splitter and the outlet port of the optical splitter; and a display unit, configured to display the identity information of the optical splitter and the outlet port of the optical splitter.

An embodiment of the present invention further provides an optical component, which includes an outlet port, the outlet port includes a port connector and an electronic label set on the port connector, identification information is set in the electronic label, and the identification information includes identity information of the optical component and the outlet port of the optical component, where the electronic label is set on the outlet port of the optical component.

In the embodiments of the present invention, an electronic label is set on an outlet port of an optical splitter, where identification information including identity information of the optical splitter and the outlet port of the optical splitter is set in the electronic label, and a recognition device is adopted to read the identification information in the electronic label to obtain the identity information of the optical splitter and the outlet port of the optical splitter. In this way, the optical splitter and the optical splitter ports are rapidly determined and distinguished, thereby improving the efficiency of recognizing the optical splitter and the optical splitter ports.

BRIEF DESCRIPTION OF THE DRAWING

To illustrate the technical solutions according to the embodiments of the present invention more clearly, the accompanying drawings for describing the embodiments are introduced briefly in the following. Apparently, the accompanying drawings in the following description are only about some embodiments of the present invention, and persons of ordinary skill in the art can derive other drawings from the accompanying drawings without creative efforts.

DETAILED DESCRIPTION OF THE EMBODIMENTS

The technical solutions of the present invention will be clearly and completely described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

Figure 1:
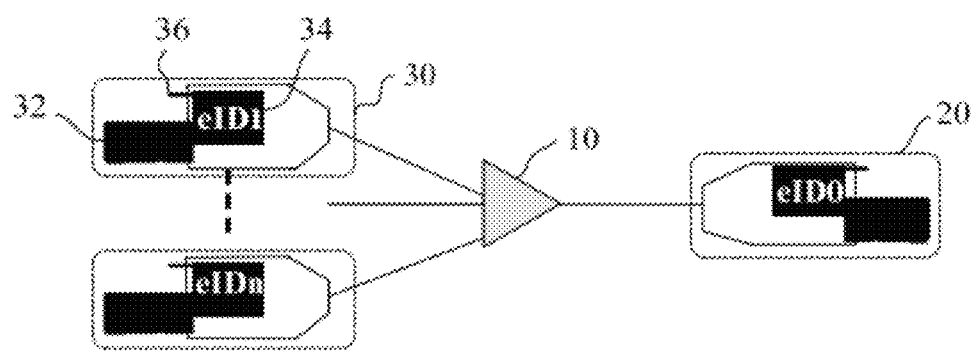
FIG. 1 is a schematic structural diagram of an optical splitter according to an embodiment of the present invention.

FIG. 1 is a schematic structural diagram of an optical splitter according to an embodiment of the present invention, where the optical splitter includes: an optical splitter module 10 and an outlet port connected to the optical splitter module 10, and the outlet port includes an input port 20 and an output port 30. The optical splitter module 10 is connected to the input port 20 and the output port 30. The input port 20 and the output port 30 each may have multiple ports. The embodiment of the present invention takes one input port 20 and at least two output ports 30 as an example. It is easy to understand that, the quantity of the input port 20 or the output port 30 is not limited to the embodiment of the present invention, and may be set as required during actual application. The structure of the input port 20 is similar to the structure of the output port 30. The embodiment of the present invention takes the output port 30 as an example for illustration.

The output port 30 includes a port connector 32, an electronic label 34 set on the port connector 32 and a probe 36 electrically connected to the electronic label 34. Identification information is set in the electronic label 34, where the identification information includes identity information of the optical splitter and the outlet port (such as the output port 30) of the optical splitter.

Various methods may be implemented to set the identity information of the optical splitter and the outlet port of the optical splitter in the electronic label 34. For example, a data storage unit is set in the electronic label 34, where the data storage unit has a specific storage length. By dividing a data structure of the specific storage length, it is specified that a specific segment of data is used to identify identity information of the optical splitter and that the other segment of data is used to identify port number information of the outlet port (such as the output port 30) of the optical splitter. The data segment of each outlet port of the same optical splitter is the same, where the data segment is used for identifying the identity information of the optical splitter. In this way, the electronic label 34 of a port connector of an outlet port can be read to learn an outlet port that is of a certain optical splitter and is corresponding to the electronic label, thereby avoiding port confusion.

Figure 2:
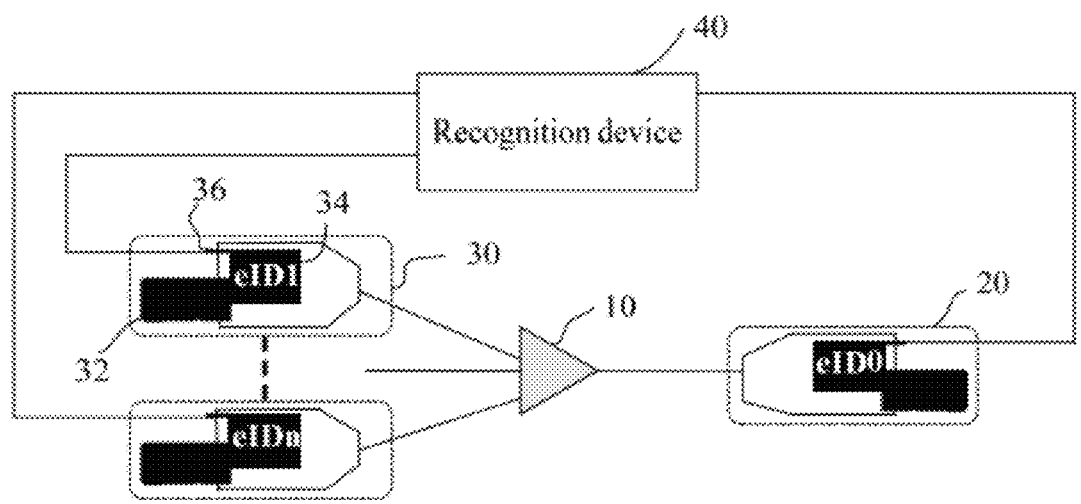
FIG. 2 is a schematic structural diagram when an optical splitter and a device for recognizing optical splitter ports are combined for use according to an embodiment of the present invention.

Referring to FIG. 2, the probe 36 is electrically connected to a recognition device 40. The recognition device 40 may read the identification information set in the electronic label 34 through the probe 36, and further parses the identification information to obtain the identity information of the optical splitter and the outlet port (such as the output port 30) of the optical splitter from the identification information. Specifically, after the recognition device 40 reads, according to the foregoing data structure settings, the identification information set in the electronic label 34, the recognition device 40 may parse the identity information of the optical splitter and the outlet port of the optical splitter according to the divided data structure.

In another embodiment, the probe 36 may not necessarily be included, the identification information set in the electronic label 34 may be read by a recognition device in a wireless mode, and then the recognition device parses the identification information to obtain the identity information of the optical splitter and the outlet port (such as the output port 30) of the optical splitter from the identification information.

In the embodiment of the present invention, the electronic label 34 may also be set on the input port 20, the detailed operation mode is the same as the operation mode of the electronic label 34 set on the output port 30, which is not described in detail herein. The electronic label 34 in the embodiment of the present invention may be a passive electronic label or an active electronic label.

In the embodiments of the present invention, an electronic label is set on an outlet port of an optical splitter, where identification information including identity information of the optical splitter and the outlet port of the optical splitter is set in the electronic label, and a recognition device is adopted to read the identification information in the electronic label to obtain the identity information of the optical splitter and the outlet port of the optical splitter. In this way, the optical splitter and each optical splitter port may be rapidly determined and distinguished, thereby improving the efficiency of recognizing the optical splitter and the optical splitter ports.

Figure 3:
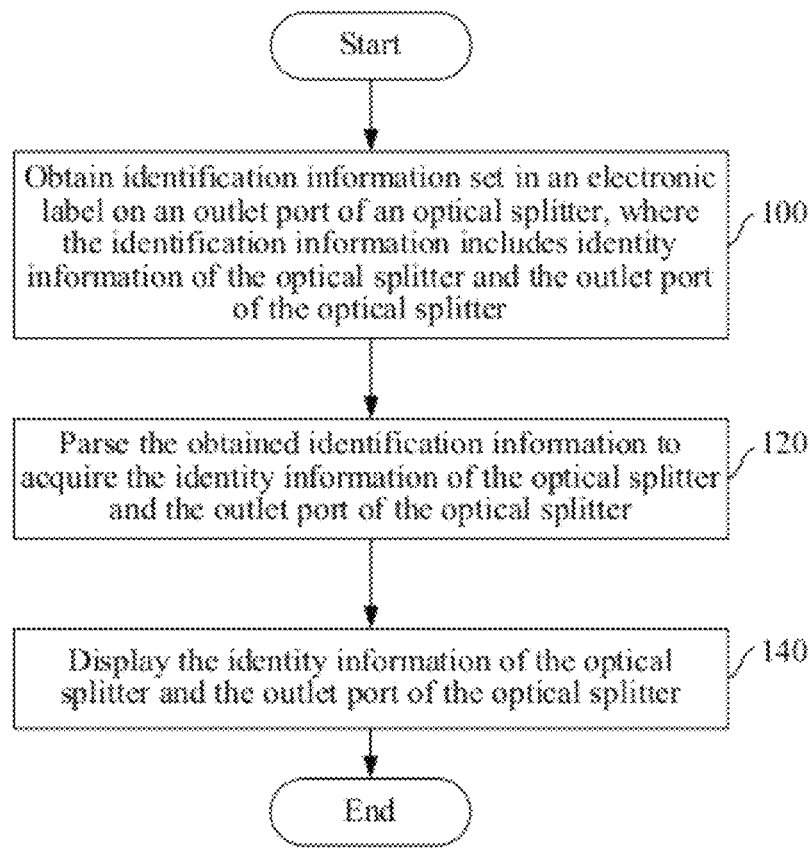
FIG. 3 is a schematic flowchart of a method for recognizing optical splitter ports according to an embodiment of the present invention.

Referring to FIG. 3, FIG. 3 is a schematic flowchart of a method for recognizing optical splitter ports according to an embodiment of the present invention, where the method includes the following steps.

Step 100: Obtain identification information set in an electronic label on an outlet port of an optical splitter, where the identification information includes identity information of the optical splitter and the outlet port of the optical splitter.

Specifically, the electronic label is set on a port connector of the outlet port of the optical splitter, such as the port connector of an input port or an output port, identification information is set in the electronic label, and the identification information includes the identity information of the optical splitter and the outlet port of the optical splitter.

Various methods may be implemented to set the identity information of the optical splitter and the outlet port of the optical splitter in the electronic label. For example, a data storage unit is set in the electronic label, where the data storage unit has a specific storage length. By dividing a data structure of the specific storage length, it is specified that a specific segment of data is used to identify the identity information of the optical splitter and that the other segment of data is used to identify port number information of the outlet port of the optical splitter. The data segment of each outlet port of the same optical splitter is the same, where the data segment is used for identifying the identity information of the optical splitter. In this way, the electronic label of a port connector of an outlet port can be read to learn an outlet port of a certain optical splitter corresponding to the electronic label, thereby avoiding port confusion.

Various modes for obtaining identification information set in an electronic label on an outlet port of an optical splitter may exist, and are specifically divided into a wired mode and a wireless mode. For the wired mode, a probe electrically connected to the electronic label may be set, the probe is electrically connected to a recognition device, and the recognition device may obtain the identification information from the electronic label through the probe. For the wireless mode, the probe may not necessarily be required, and the recognition device directly obtains the identification information from the electronic label in the wireless mode.

Step 120: Parse the obtained identification information to acquire the identity information of the optical splitter and the outlet port of the optical splitter.

Specifically, the recognition device in step 100 may parse the identity information of the optical splitter and the outlet port of the optical splitter according to the data structure of the data storage unit in the electronic label.

Step 140: Display the identity information of the optical splitter and the outlet port of the optical splitter.

The parsed identity information of the optical splitter and the outlet port of the optical splitter may be displayed through a display unit, and the display unit may be a display module set in the recognition device, such as an LCD or an LED display screen, helping users rapidly acquire the identity information of the outlet port of the optical splitter that is to be determined In the embodiment of the present invention, identification information set in an electronic label on an outlet port of an optical splitter is read and parsed to obtain identity information of the optical splitter and the outlet port of the optical splitter from the identification information, and then the identity information of the optical splitter and the outlet port of the optical splitter is displayed. In this way, the optical splitter and each optical splitter port may be rapidly determined and distinguished, thereby improving the efficiency of recognizing the optical splitter and the optical splitter ports.

Figure 4:
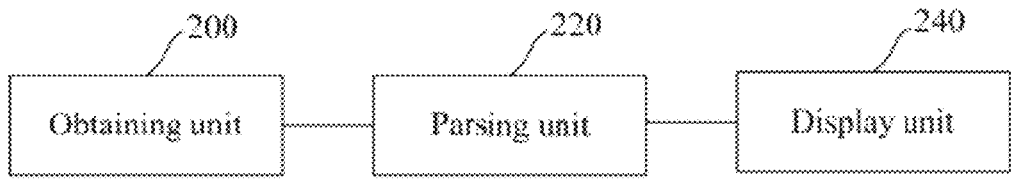
FIG. 4 is a schematic structural diagram of a device for recognizing optical splitter ports according to an embodiment of the present invention.

FIG. 4 is a schematic structural diagram of a device for recognizing optical splitter ports according to an embodiment of the present invention, where the device includes:

A obtaining unit 200, which is configured to obtain identification information set in an electronic label on an outlet port of an optical splitter, where the identification information includes identity information of the optical splitter and the outlet port of the optical splitter.

Specifically, the electronic label is set on a port connector of the outlet port of the optical splitter, such as the port connector of an input port or an output port, identification information is set in the electronic label, and the identification information includes the identity information of the optical splitter and the outlet port of the optical splitter.

Various methods may be implemented to set the identity information of the optical splitter and the outlet port of the optical splitter in the electronic label. For example, a data storage unit is set in the electronic label, where the data storage unit has a specific storage length. By dividing a data structure of the specific storage length, it is specified that a specific segment of data is used to identify the identity information of the optical splitter and that the other segment of data is used to identify port number information of the outlet port of the optical splitter. The data segment of each outlet port of the same optical splitter is the same, where the data segment is used for identifying the identity information of the optical splitter. In this way, the electronic label of a port connector of an outlet port can be read to learn an outlet port that is of the optical splitter corresponding to the electronic label, thereby avoiding port confusion.

Various modes for obtaining the identification information set in an electronic label on an outlet port of an optical splitter may exist, and are specifically divided into a wired mode and a wireless mode. For the wired mode, a probe electrically connected to the electronic label may be set, where the probe is electrically connected to a recognition device, and the obtaining unit 200 may obtain the identification information from the electronic label through the probe. For the wireless mode, the probe may not necessarily be required, and the obtaining unit 200 directly obtains the identification information from the electronic label in the wireless mode.

A parsing unit 220, which is configured to parse the obtained identification information to acquire the identity information of the optical splitter and the outlet port of the optical splitter.

Specifically, the parsing unit 220 parses the identity information of the optical splitter and the outlet port of the optical splitter according to the data structure of a data storage unit in the electronic label.

A display unit 240, which is configured to display the identity information of the optical splitter and the outlet port of the optical splitter.

The identity information of the optical splitter and the outlet port of the optical splitter parsed by the parsing unit 220 may be displayed by the display unit 240. The display unit 240 may be a display module set in the recognition device, such as an LCD or an LED display screen, helping users to rapidly obtain the identity information of the outlet port of the optical splitter that is to be determined.

In the embodiment of the present invention, identification information set in an electronic label on an outlet port of an optical splitter is read by the obtaining unit 200 and is parsed by the parsing unit 220 to obtain identity information of the optical splitter and the outlet port of the optical splitter from the identification information, and then the identity information of the optical splitter and the outlet port of the optical splitter is displayed by the display unit 240. In this way, the optical splitter and each optical splitter port may be rapidly determined and distinguished, thereby improving the efficiency of recognizing the optical splitter and the optical splitter ports.

Persons of ordinary skill in the art should understand that all or a part of the processes of the method according to the embodiments of the present invention may be implemented by a program instructing relevant hardware. The program may be stored in a computer readable storage medium. When the program runs, the processes of the method according to the embodiments of the present invention are performed. The storage medium may be a magnetic disk, an optical disk, a read-only memory (Read-Only Memory, ROM), a random access memory (Random Access Memory, RAM), and the like.

The electronic label in the embodiments of the present invention may be used in other optical components, such as an arrayed waveguide grating (arrayed waveguide grating, AWG), an optical coupler and an optical switch, where the optical component includes an outlet port, the outlet port includes a port connector and an electronic label set on the port connector, identification information is set in the electronic label, and the identification information includes identity information of the optical component and the outlet port of the optical component. The corresponding optical component and the port number information of the optical component are automatically recognized by reading the identification information in the electronic label.

The above description is merely exemplary embodiments of the present invention, but not intended to limit the protection scope of the present invention. All variations or substitutions that can be easily figured out by persons skilled in the art within the technical scope disclosed by the present invention shall fall within the protection scope of the present invention. Therefore, the protection scope of the invention is defined by the protection scope of the claims.

What is claimed is:

1. An optical component, comprising an optical splitter module, an input port, and a plurality of output ports, the input port and the output ports are connected to the optical splitter;
wherein each output port comprises a first port connector and a first electronic label in the first port connector, the first electronic label comprises a first data storage unit for storing first identification information, the first identification information comprises identity information of the optical component and a port number of an output port;
wherein the input port comprises a second port connector and a second electronic label, the second electronic label comprises a second data storage unit for storing second identification information, the second identification information comprises identity information of the optical component and a port number of the input port.

2. An optical component, comprising an optical splitter module, an input port, and a plurality of output ports, the input port and the output ports are connected to the optical splitter;
wherein each output port comprises a first port connector and a first electronic label in the first port connector, the first electronic label comprises a first data storage unit for storing first identification information, the first identification information comprises identity information of the optical component and a port number of an output port;
wherein the input port comprises a second port connector and a second electronic label, the second electronic label comprises a second data storage unit for storing second identification information, the second identification information comprises identity information of the optical component and a port number of the input port;
wherein the first identification information comprises a first data segment for carrying the identity information of the optical component and a second data segment for carrying the port number of the output port, wherein the first data segment is the same as that of other first identification information corresponding to other output port.

3. The optical component of claim 2, wherein the output port further comprises a probe coupled to the first electronic label, the probe is configured for providing the first identification information to a recognition device when the recognition device reads the first identification information.

4. The optical component of claim 2, wherein the output port further comprises a wireless interface for providing the first identification information to a recognition device in a wireless mode when the recognition device reads the first identification information.

5. The optical component of claim 1, wherein the optical component is an optical splitter.

6. The optical component of claim 1, wherein the optical component is an arrayed waveguide grating (AWG).

7. The optical component of claim 1, wherein the optical component is an optical coupler.

8. The optical component of claim 1, wherein the optical component is an optical switch.

9. The optical component of claim 2, wherein the optical component is an optical splitter.

10. The optical component of claim 2, wherein the optical component is an arrayed waveguide grating (AWG).

11. The optical component of claim 2, wherein the optical component is an optical switch.

* * * * *